United States Patent [19]

Chang

[11] 4,238,519

[45] Dec. 9, 1980

[54] EGG ALBUMEN EXTENDER PREPARED FROM DERIVED PROTEIN-CONTAINING COMPOSITIONS AND ADDITIVES

[75] Inventor: Pei K. Chang, Montrose, N.Y.

[73] Assignee: Stauffer Chemical Company, Westport, Conn.

[21] Appl. No.: 970,688

[22] Filed: Dec. 18, 1978

[51] Int. Cl.³ .............................................. A23J 3/02
[52] U.S. Cl. ........................... 426/549; 426/564; 426/583; 426/614; 426/656; 426/657; 426/572; 426/568; 426/571
[58] Field of Search ............... 426/564, 583, 614, 656, 426/657, 549, 568, 572, 571

[56] References Cited

U.S. PATENT DOCUMENTS

| | | | |
|---|---|---|---|
| 2,695,235 | 11/1954 | de Goede | 426/583 |
| 2,765,232 | 10/1956 | Rodgers et al. | 426/583 |
| 2,844,468 | 7/1958 | Gunther | 426/656 |
| 2,929,715 | 3/1960 | Sutton | 426/656 |
| 3,356,507 | 1/1967 | Wingerd | 426/583 |
| 3,487,064 | 12/1969 | Swanson et al. | 426/583 |
| 3,628,968 | 12/1971 | Noznick et al. | 426/583 X |
| 3,637,643 | 1/1972 | Wingerd | 426/583 |
| 3,896,241 | 7/1975 | Malaspina et al. | 426/583 |
| 3,922,375 | 11/1975 | Dalan et al. | 426/583 |
| 4,089,987 | 5/1978 | Chang | 426/564 |
| 4,120,986 | 10/1978 | Lynn | 426/656 |

*Primary Examiner*—Jeanette M. Hunter
*Attorney, Agent, or Firm*—Paul J. Juettner

[57] ABSTRACT

New egg albumen extenders are provided comprising a derived protein-containing composition obtained from plant or animal sources, wherein said derived protein-containing composition has a molecular weight of less than 20,000, a total Kjeldahl nitrogen (TKN) content of from about 0.45 to about 2.1% of which at least 60% of the Kjeldahl nitrogen is non-protein nitrogen, and optionally, a whipping aid such as an enzyme modified wheat or soy protein, in combination with a member selected from the group consisting of gelatin, gelatin and a water soluble polyphosphate, a gum and mixtures thereof.

The products of the invention can be used as egg albumen extenders in whipped products such as meringues, nougat candy, divinity candy and cakes such as yellow or sponge cake.

32 Claims, No Drawings

EGG ALBUMEN EXTENDER PREPARED FROM DERIVED PROTEIN-CONTAINING COMPOSITIONS AND ADDITIVES

BACKGROUND OF THE PRESENT INVENTION

1. Field of the Invention

The present invention relates to new products prepared from derived protein-containing compositions usable as egg albumen extender compositions.

2. Description of the Prior Art

Egg albumen is a known aerating agent in numerous food products.

Due to the expense of egg albumen, many attempts have been made to duplicate the aerating qualities of egg albumen with less expensive materials.

In recently issued U.S. Pat. No. 4,089,987 (May 16, 1978), entitled WHIPPING COMPOSITION OF MODIFIED WHEY PROTEIN AND ADDITIVES (P. K. Chang), there is disclosed various compositions which can be used to replace egg albumen in hard meringue comprising an isolated whey protein concentrated prepared by various physical and chemical protein concentration procedures including ultrafiltration or chemical precipitation of protein and:
 (1) gelatin
 (2) gelatin and a water soluble polyphosphate
 (3) a gum, and
 (b 4) mixtures thereof. These systems can also include an enzyme modified wheat protein as disclosed in U.S. Ser. No. 926,682, filed July 21, 1978 in the name of P. K. Chang. These replacers require the use of concentrated whey protein which is costly. This whey protein concentrate is generally prepared by the ultrafiltration of whey and provides a large quantity of a byproduct (the permeate) which is high in lactose and ash and low in protein, i.e. approximately 82% lactose, 12% ash and 6% low molecular weight protein (TKN X 6.38). Even after removing the lactose by normal lactose crystallization procedures, the now delactosed permeate still contains 40-45% lactose, 25-35% ash and 8-12% protein (TKN X 6.38). Since total Kjeldahl nitrogen is a measure of all of the nitrogen present in the system (protein as well as non-protein nitrogen), the percent protein based on total Kjeldahl nitrogen is an approximation. While the delactosed permeate is indicated to have 8%-12% protein (TKN X 6.38), more than 60% of this protein is based on non-protein nitrogen, i.e. derived protein and amino acids. Derived protein is defined as a decomposition product of proteins that is intermediate in complexity of structure between proteins and amino acids (Hackh's, Chemical Dictionary, 3rd Ed.)

An economically attractive process for concentrating whey protein by ultrafiltration requires that a commercial outlet be found for the permeate and the delactosed permeate. To date, few successful outlets for these by-products have been found.

It is well known that proteose peptones are useful as whipping aids (see G. B. 1,470,896). These peptones cover a wide molecular weight range and require extensive processing.

It is also known that hydrolyzed wheat or soy protein is useful as a whipping aid. Enzyme modified proteins are low in molecular weight and high in non-protein nitrogen. These low molecular weight enzyme modified proteins which are high in non-protein nitrogen have been reported in the literature as powerful whipping aids.

While permeate and delactosed permeate are known protein-containing compositions wherein a large percentage of the total Kjeldahl nitrogen is non-protein nitrogen, these materials cannot be used alone to provide stable foams.

It is also known that meringues can be stabilized with starch and gums. Commercial meringue stabilizers containing these ingredients are available.

It has now been found that effective egg albumen extenders can be prepared using derived protein-containing compositions such as the permeate and delactosed permeate resulting from the ultrafiltration of whey.

BRIEF DESCRIPTION OF THE INVENTION

In accordance with the present invention, new egg albumen extenders are provided comprising at least 65% by weight on a dry solids basis of a derived protein-containing composition from plant or animal sources wherein said derived protein-containing composition has a molecular weight of less than 20,000, a total Kjeldahl nitrogen content of from about 0.45% to about 2.1% of which at least 60% of the nitrogen is non-protein nitrogen, and from 0% to about 30% of a whipping aid, in combination with a member selected from the group consisting of gelatin, gelatin and a water soluble polyphosphate, a gum and mixtures thereof in percentages given hereinafter.

The products of the present invention are useful as egg albumen extenders in whipped products such as meringue, nougat candy and divinity candy, and cakes such as yellow or sponge cake.

Egg albumen extended with the extender compositions of the present invention exhibited the same and in some cases, improved whipping characteristics over unextended egg albumen at a lower cost than egg albumen alone.

DETAILED DESCRIPTION OF THE PRESENT INVENTION

The gelatin used in the present invention can be either of the alkaline or preferably the acid prepared type. Gelatins ranging in Bloom strength from about 100 to about 300 and preferably from about 200 to about 250 Bloom can be used. The gelatin can be predissolved in water to facilitate incorporation. Preferably "cold-water dispersible" gelatin is used.

The water soluble polyphosphates usable in the present invention are medium chain length sequestering type polyphosphates of the formula:

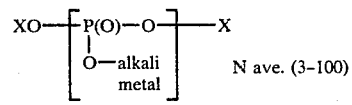

wherein X is hydrogen or alkali metal. Preferably the average chain length (N ave.) is from 3 to 20. Representative compositions within this group are sodium or potassium tripolyphosphate, sodium or potassium tetrapolyphosphate, sodium or potassium hexametaphosphate, the more preferred being sodium hexametaphosphate (SHMP) with an average chain length 6–18, and the most preferred 9–12.

The gums which can be used in the present invention include any of the edible gums or protective colloids such as carrageenan, alginates including sodium or potassium alginate, cellulose gum including sodium carboxymethylcellulose, methyl cellulose, hydroxymethylcellulose, hydroxyethylcellulose, hydroxypropyl cellulose, hydroxymethylpropylcellulose and preferably carboxymethylcellulose, accacia, guar, xanthan, and mixture thereof.

The gum is preferably used in an amount ranging from about 0.5% to an amount above which the final product shows adverse properties in the area of use. In general, the gum is not to exceed about 5% by weight based on the egg albumen extender, the upper limit varying depending on the actual gum utilized. In some cases, more can be used and in some cases less.

The preferred gum is carrageenan which is used in amounts ranging from 0.5% up to and including about 3%.

The optional whipping aid is illustrated by enzyme hydrolyzed wheat or soy protein which can be prepared by hydrolyzing any wheat or soy protein of wheat protein mixture such as gluten by any proteolytic enzyme effective for that purpose provided the final product has a bland flavor which will not affect the over-all flavor of the egg albumen replacer. Proteolytic enzymes are well known to those skilled in the art and effective proteolytic enzymes can be easily determined by such person. While the enzymatically hydrolyzed wheat or soy protein can be used alone, it is preferably used with a small quantity (up to and including about 10%) of a sugar to assist in wetting and more preferably with an additional quantity of starch (up to and including about 20%) to thicken and stabilize the mixture, the percentage being by weight based on the total weight of the enzyme hydrolyzed wheat protein. An illustrative of these materials is HYFOAMA 68 available from Naarden Lenderrink and Co., Belgium and GUNTHERS 400 V available from A. E. Staley.

The former material has 60% protein, 5% water, 6% ash and 20% carbohydrate. The enzymatically hydrolyzed wheat protein is used in amounts of from about 5 to about 30% and preferably from about 10% to about 20% by weight based on the total weight of the whippable whey protein containing composition.

The latter material is composed of enzymatically modified soy protein (55% of total), sodium hexametaphosphate, gelatin and sodium aluminum sulfate.

The egg albumen extender of the present invention comprises at least 65% of a derived protein-containing composition. The molecular weight for substantially all matter in the derived protein-containing composition is less than 20,000. A material which has been ultrafiltered through a membrane having a molecular cut-off of 20,000 is considered less than 20,000.

The nitrogen in the derived protein-containing composition is determined by the Kjeldahl method. The amount of protein can be estimated by multiplying the amount of nitrogen calculated from the amount of ammonium sulfate formed by a constant, i.e., 6.38 for milk protein. This method determines nitrogen from all sources, and cannot differentiate between protein nitrogen and non-protein nitrogen. The protein content is an estimation since the non-protein nitrogen is included in the calculation. In the present invention, the total Kjeldahl nitrogen content in the derived protein-containing composition preferably ranges from about 0.45% to about 2.1% and more preferably from about 1.1% to about 2.1% providing a total Kjeldahl protein content of from about 3% to about 13% and from about 7% to about 13% respectively. Of the total Kjeldahl nitrogen at least about 60% is non-protein nitrogen. Non-protein nitrogen is determined by adding trichloroacetic acid to a protein solution in an amount sufficient to provide about a 15% solution of trichloroacetic acid. Protein is precipitated and removed by centrifugation. The nitrogen content of the supernatant is determined by Kjeldahl nitrogen method. The percent total non-protein nitrogen is determined by dividing the trichloroacetic acid soluble Kjeldahl nitrogen by the total Kjeldahl nitrogen content of the original solution on a dry solids basis. The non-protein nitrogen can range as high as 2.1% (all non-protein nitrogen) and preferably from about 0.66% to about 1.68%.

The percentage of Kjeldahl nitrogen and non-protein nitrogen is based on a dry solid basis of the weight of the derived product containing composition.

The derived protein-containing composition can be prepared from legumes, oil bearing seeds, milk or milk derived products. The derived protein-containing compositions are usually by-products of a previous procedure used to extract an ingredient from the main source.

The legumes include any members of the pea family such as peas, soy beans and peanuts and preferably soy beans. The oil bearing material seeds include those materials from which oil is extracted such as cottonseed, safflower, corn and the like.

The derived protein-containing compositions used in the present invention are prepared, for instance, by precipitating protein from an aqueous solution in a manner similar to cheese or soy protein isolate production. When preparing soy protein isolate, soy protein is extracted from defatted soy flour and is separated from the solution by acidifying to pH of approximately 4.6. The precipitated product is called soy protein isolate and the supernatant is termed soy whey. In the countries of the Far East, a similar product is prepared by precipitating a curd or tofu from soy milk leaving a similar soy whey. These soy wheys can be further processed to remove the higher molecular weight protein and provide a product usable in the present invention. Other such by-products can be prepared from other legume or oil bearing seeds.

The derived protein-containing composition is preferably obtained from a dairy source, i.e., milk and milk derived products. The derived protein-containing composition prepared from a dairy source is generally the by-product of a physical or chemical separation or fractionation of the various components in the milk or milk derived product. Such physical or chemical processes include gel permeation filtration, ultrafiltration, dialysis, electriodialysis, as well as protein precipitation processes such as cheese production, either enzyme or acid, chemical precipitation including acid addition for casein precipitation, polyphosphate, sodium lauryl sulfate or other such chemical precipitations.

Preferably the by-product from which the derived protein-containing composition is prepared is derived from soy or dairy whey and more preferably the by-product from the enzyme or acid precipitation of proteins from milk or skim milk, i.e., dairy whey. Included within the latter group are cheese whey and casein whey (the whey left after the acid precipitation of casein). A preferred group of source materials includes cheese whey, casein whey and soy whey.

The by-products described above are generally processed to further reduce the protein constituent therein. For instance, the preferred wheys can be filtered through an ultrafiltration membrane to provide a protein rich retentate and a lactose rich permeate. Since the permeate and the delactosed form thereof have been found to be particularly effective in the present invention, the remaining discussion for illustrativve purposes will be directed to those species.

The permeate and delactosed permeate are derived from whey and can be prepared from sweet whey or cheddar, cottage, casein, cream, Swiss, and mozarella wheys as well as modified forms thereof including delactosed whey, whey protein concentrate, demineralized whey and the like. An effective egg albumen extender can be prepared from a product derived by passing whey through an ultrafiltration membrane having at the maximum a 20,000 molecular weight cut-off.

The whey by-product should contain a limited amount of fat since fat is known to affect the whipping characteristics of protein such as egg albumen. It is preferred that the whey by-product have no more than 0.25% fat as measured by the Association of Official Analytical Chemists (A.O.A.C.) method 16.181 and 16.182 published in the Twelfth Edition (1975).

The use of low fat whey and the use of ultrafiltration can be a means of providing a product having a fat content sufficiently low to be effectively in the present invention.

The preferred product used in the present invention is the permeate and preferably the delactosed permeate resulting from the ultrafiltration of acid or cottage cheese whey. A representative method for ultrafiltration is disclosed in Horton, B. S. et al., Food Technology, Vol. 26, p. 30, 1972. In a typical process, cottage cheese whey is neutralized to a pH 6.4 with 50% caustic. After storage, the pH is then adjusted to 7.2 and any solids or precipitates are removed by centrifugal clarifiers. The clarified liquor is then pasteurized. The liquor is then fed into an ultrafiltration membrane unit. Membranes having molecular weight cutoffs equal to or less than 20,000 can be used. The permeate can be condensed and sold as a liquid, codried with other materials such as soy flour or sodium caseinate or frozen. The permeate can also be delactosed at this stage by any normal lactose crystallization techniques. If a membrane having a 20,000 molecular weight cut-off is used, the permeate generally comprises from about 4% to about 6% protein (based on total Kjeldahl nitrogen), from about 80% to about 83% lactose, from about 10% to about 12% ash and substantially no fat. The delactosed permeate generally comprises from about 8% to about 12% protein (based on total Kjeldahl nitrogen), from about 42% to about 45% lactose, from 25% to about 35% ash and substantially no fat. If a membrane having a higher molecular weight cut-off is used, the protein content will generally decrease. Conversely, a membrane having a lower molecular weight cut-off will generally show a decrease in protein and an increase in lactose in the product.

The protein content stated above is based on total Kjeldahl nitrogen though approximately 60% of the total Kjeldahl nitrogen is non-protein nitrogen. It is believed that the non-protein nitrogen is mainly present in the form of derived proteins including peptides and amino acids. This is a theory and applicant does not intend to be bound thereby.

As used herein the term "derived protein containing composition" is intended to include all protein decomposition products including peptides and amino acids.

The ultrafiltration of whey can be accomplished by using whey, concentrated whey, delactosed whey, delactosed clarified whey and the like. As used herein, the term permeate or delactosed permeate derived from whey is intended to cover the by-products of the ultrafiltration of whey, condensed whey, delactosed whey, delactosed clarified whey and other such whey sources.

Milk and preferably skim milk can also be directly filtered through an ultrafiltration membrane. Since the cheese making process essentially removes only the casein, the remainder of the ingredients of the milk are in the whey. Membrane filtration of the milk will remove the casein along with the materials removed by the membrane from the whey. The permeate from the ultrafiltration of milk is substantially the same as that obtained from whey.

When the ultrafiltration procedures are followed, the starting material can be the partially delactosed, demineralized product resulting from treatment of cheese whey with a divalent metal ion and adjustment of the pH to a value above 6 at a temperature below 60° C. in accordance with the teachings of U.S. Pat. No. 3,560,219 to Attebery or by removing the precipitate formed by neutralizing acid whey as outlined in U.S. Pat. No. 4,036,999.

The amount of permeate or delactosed permeate used is generally dependent on the amount of additives used. Generally, the permeate and/or delactosed permeate comprise at least about 65% by weight (dry solids basis) of the blend, the remainder of the blend upon which the percentage is based being made up with gelatin, gelatin and polyphosphate and/or a gum and, optionally, a whipping aid such as the enzymatically hydrolyzed wheat protein including any starch or sugar additives to the gluten. The gelatin can be used in an amount ranging from about 1% to about 15%, preferably from about 3% to about 12% and more preferably from about 3% to about 5% by weight. When using gelatin alone (no polyphosphate) it is more preferably used in an amount ranging from about 3% to about 12% by weight. When used in combination with the polyphosphate, results equivalent to those obtained using gelatin alone can be obtained using less gelatin. In some cases, the amount of gelatin used with the polyphosphate can be reduced by as much as 50% over the quantity of gelatin used along while providing substantially equivalent results. When using the gelatin with the polyphosphate, the preferred amount of gelatin with the polyphosphate, the preferred amount of gelatin is from about 3% to about 5%, the preceding broad and intermediate ranges being applicable.

The polyphosphate used in the present invention is preferably sodium hexametaphosphate. Sodium hexametaphosphate has been found to be usable within the range of from about 5% to about 25% by weight, preferably from about 9% to about 20% and more preferably, from about 18% to about 20%. In general, as the amount of polyphosphate increases, the amount of gelatin decreases.

In one whippability study at a 10% level of sodium hexametaphosphate, the stability of the foam is affected by the level of gelatin. The foam is more stable at gelatin concentrations of 8% and 12% than 4%. At a 19% level of sodium hexametaphosphate, the stability of the foam is not affected by the level of gelatin though a slight increase in the specific gravity of the foam was noticed as the gelatin content increased. It is preferred that the additive total of gelatin and polyphosphate not exceed 35% and preferably not above 25%.

The percentages referred to hereinbefore are by weight on a dry solids basis based on the combined weight of the derived protein-containing composition, gelatin, polyphosphate, gum and optional whipping aid.

If desired, sodium aluminum sulfate can be added in an amount up to and including about 5%, and preferably from about 1% to about 2% by weight of the dry egg albumen extender to further improve the stability of the foam.

Also, it has been found desirable to include from 0% to about 5% and preferably from about 1% to about 2.5% by weight of the dry egg albumen extender of an acidifying agent in the form of anhydrous monocalcium phosphate. This agent contributes calcium ion to the system.

Other optional ingredients such as flavorings, i.e., sugar, salt, vanilla extract and the like, and colorings, fillers, and the like can be added if desired. The basis for calculating the percentage for the composition includes only the permeate and/or delactosed permeate, gelatin, polyphosphate, gum and whipping aid and does not include any of the aforementioned optional ingredients including the sodium aluminum sulfate, and the acidifying agent. The gelatin, polyphosphate and gum are intended not to provide more than 35% of the composition.

The egg albumen extenders of the invention can be prepared by dry blending the ingredients in the proportions desired. Liquid formulations can also be used but these require refrigeration. The products can be preblended for shipment to user or preblended in user's plant. Blending can also be accomplished in situ in the final use product. The dissolution of gelatin in a liquid system is facilitated by heating to 40°–50° C. followed by cooling. Since permeate and delactosed permeate are hygroscopic, liquid formulations are preferred. The extender is used in an amount sufficient to provide a solids content of from about 9% to about 14% and preferably from about 10% to about 12% in water. The solid content of liquid egg albumen is about 11.5%.

The products of the present invention can be used as partial extenders for the egg albumen requirements of a recipe when the albumen is used for its aerating qualities, such as meringue, candy and cakes. Liquid mixtures of albumen and the compositions of the invention can be prepared and frozen or dried as desired.

In general, food compositions utilizing egg albumen normally contain from about 0.5% to about 10% and preferably from about 1% to about 8% egg albumen (dry solids basis) based on the weight of the total dry solids of the food composition.

All the compositions of the invention are effective as an extender for egg albumen in amounts ranging from about 0.5% to about 60% replacement for aeration in meringue in amounts up to 60% and preferably from about 20% to about 30%. The use of the extender at 50% egg albumen replacement requires slightly different processing conditions. At a 50% level of replacement, whipping time is longer, i.e., approximately 60% greater. However, the replacement level is dependent on the environment of use. Adjustments can be easily made by one skilled in the art.

In areas of use where the aerating qualities of egg albumen are not as critical as those for meringue, egg albumen can be replaced in an amount of up to 100%. Preferably, the formulations of the invention are used in combination with egg albumen to extend egg albumen. Use of at least 25% albumen and less than 75% egg albumen extender of the invention is recommended, the percentage being based on the combined dry weight of the egg albumen and the egg albumen extender.

The egg albumen extenders of the present invention can be used to replace quantities of whole egg in a baked good recipe. Whole egg is generally used in an amount ranging from about 0.1% to 10% by weight. The product of the present invention can be used to replace up to approximately 50% of the whole egg requirement of a baked good recipe. While recipes vary as to critical amounts, one skilled in the art can adjust the amount to provide the operable results needed.

The egg albumen extenders of the present invention can also be used in combination with egg albumen, egg yolk and/or an egg yolk extender or replacer to prepare extended whole eggs. It is known that whole liquid eggs comprise in general approximately ⅓ yolk and ⅔ albumen on a liquid basis. The egg is approximately 25% solids and 75% water. Egg albumen is approximately 88% water and 12% solids. Egg yolk is approximately 48% water and 52% solids. An extended whole egg can be prepared by substituting from about 0.5% to about 60% of the albumen of whole egg with the products of the invention. The remainder of the egg can be egg yolk and/or an egg yolk extender or replacer.

The percentages which are stated to be by weight based on the total weight of the egg albumen extender are intended to be based on the combined dry weight of the protein-containing composition, the gelatin, polyphosphate, gum and whipping aid additives unless otherwise stated.

The invention is more fully illustrated in the Examples which follow.

EXAMPLES 1–6

Egg albumen extenders were prepared by predissolving gelatin in water at about 45° C. and cooling to 25° C. Sodium hexametaphosphate (N ave. 9–12) and delactosed permeate are dissolved in the gelatin solution at a total solids level equivalent to liquid egg white (11.5%) in accordance with the proportions given in Table I. After cooling to 25° C., the extenders were ready for use.

TABLE 1

| Example Number | Percent Gelatin* (220 Bloom) | Percent SHMP* (9–12 N ave) | Percent Delactosed Permeate* |
|---|---|---|---|
| 1 | 4 | 10 | 86 |
| 2 | 8 | 10 | 82 |
| 3 | 12 | 10 | 78 |
| 4 | 4 | 19 | 77 |
| 5 | 8 | 19 | 73 |
| 6 | 12 | 19 | 69 |

*Solids Basis

EXAMPLES 7–20

Soft Meringue

Soft meringues were prepared by combining 40 grams of an egg albumen extenders and 120 grams of liquid albumen for a total of 160 grams or a 25% albumen replacement level. Cream of tartar in an amount of 7.0 grams was dissolved in the egg albumen replacer/albumen mixture or in 160 grams of egg liquid albumen alone in the case of the control. The mixture was whipped in a Hobart C-100 mixer eqipped with a 2.85 liter (3 quart) bowl on speed 3 for 2 minutes. The specific gravity was between 0.12 and 0.13. 204 grams of sugar was added gradually during mixing at a rate of 5 milliliters (one teaspoon) per five seconds, mixing being continued for a total of five additional minutes.

The specific gravity of the foam was then measured. The stability of the foam was determined by the syneresis (weep) rate, i.e. the amount of drainage after 24 hours at 4° to 7° C. (40°-45° F.) from 40 grams of foam setting on a wire screen inside a 200 milliliter funnel.

Two samples of 40 grams each were baked at 204° C. (400° F.) for 7 minutes. The Specific Volume was determined following 24 hours drying at 40° C.

The results obtained are reported in Tables 2 and 3. Tables 2 and 3 show the results of duplicate runs using different batches of eggs. The pH for all samples was 4.9 with the exception of the controls which were 5.0.

TABLE 2

EFFECTS OF GELATIN AND SHMP ON FUNCTIONALITY OF DLP IN SOFT MERINGUE

| EXAMPLE NUMBER | PRODUCT OF EXAMPLE | FOAM SP. GR. | Synersis (ML). | MERINGUE SP. VOL. |
|---|---|---|---|---|
| 7 | 1 | .1783 | 0.5 | 8.27 |
| 8 | 2 | .1867 | 1.3 | 7.99 |
| 9 | 3 | .1924 | 2.3 | 7.54 |
| 10 | 4 | .1847 | 0.3 | 7.52 |
| 11 | 5 | .1902 | 0.5 | 6.76 |
| 12 | 6 | .1918 | 1.3 | 8.01 |
| 13 | Control | .1870 | 0 | 4.34 |

TABLE 3

EFFECTS OF GELATIN AND SHMP ON FUNCTIONALITY OF DLP IN SOFT MERGINGUE

| EXAMPLE NUMBER | PRODUCT OF EXAMPLE | FOAM SP. GR. | WEEP (ML) | MERINGUE SP. VOL. |
|---|---|---|---|---|
| 14 | 1 | .1859 | 1.0 | 7.87 |
| 15 | 2 | .1927 | 1.8 | 6.78 |
| 16 | 3 | .1939 | 4.1 | 8.55 |
| 17 | 4 | .1967 | 2.3 | 7.70 |
| 18 | 5 | .1861 | 0.8 | 7.71 |
| 19 | 6 | .1859 | 1.8 | 9.57 |
| 20 | Control | .1981 | 0 | 5.49 |

On a 25% liquid albumen replacement level, all baked meringues containing egg albumen extenders had a greater specific volume in comparison to the albumen control. The baked meringue containing the albumen extenders of the invention had more stiff peaks but was generally more sticky upon drying than the albumen control. No difference in stability was observed between the baked meringues containing either albumen alone or the albumen extender of the invention even though the syneresis (weep) of the foam for the latter was slightly greater than for the former.

The flavor of the meringue containing the albumen extender of the invention was more flavorful and the degree of sweetness was enhanced over that of the albumen control. In general, the flavor of the albumen control meringue was mild and bland.

Based on these findings, the product of Example No. 4 (Table 1) containing 4% gelatin, 19% SHMP and 77% DLP was selected for further investigations in relation to the effects of (a) egg albumin replacement level, and (b) comparison to commercial whipping agents.

EXAMPLES 21-35

The compositions of Examples 1-6 were also tested using a commercial whippability test as follows:

The temperature of 450 milliliters of liquid albumen or 25% liquid albumen replacer/75% liquid albumen was adjusted to 20° C. and whipped for 90 seconds at Speed No. 2 in a Hobart Model C-100 Mixer equipped with a 9.46 liter (10 quart) bowl and at Speed No. 3 for 90 seconds. The height, specific gravity and syneresis (weep) of 40 grams of foam after 30 minutes and 60 minutes standing was determined. Break, the ease at which the foam can be clearly pulled apart by hand, was also measured. The results are reported in Tables 4 and 5 below. The break of all samples of Tables 4 and 5 was acceptable.

TABLE 4

| | | COMMERCIAL WHIPPABILITY TEST | | | | |
|---|---|---|---|---|---|---|
| EXAMPLE NUMBER | PRODUCT OF EXAMPLE | pH | HEIGHT (CM) | SPECIFIC GRAVITY | SYNERESIS (ML) 30 MIN. | 60 MIN. |
| 21 | 1 | 8.7 | 12.70 | .0754 | 6.6 | 17.2 |
| 22 | 2 | 8.7 | 12.70 | .0808 | 4.8 | 13.8 |
| 23 | 3 | 8.7 | 12.70 | .0851 | 3.0 | 10.0 |
| 24 | 4 | 8.6 | 13.97 | .0790 | 3.2 | 11.4 |
| 25 | 5 | 8.6 | 13.97 | .0813 | 3.4 | 12.4 |
| 26 | 6 | 8.8 | 13.46 | .0817 | 4.2 | 12.0 |
| 27 | Control* | 9.1 | 13.97 | .0861 | 1.8 | 7.2 |

*Liquid egg albumen

At 10% SHMP level (examples 21, 22 and 23), the stability of the foam is affected by the level of gelatin. The foam is more stable at 8% and 12% than at 4% gelatin. At 19% SHMP level (examples 24, 25 and 26), the stability of the foam is not affected by the level of gelatin. The foam is as stable at 4% gelatin as at either 8% or 12%.

The whippability test was repeated using two other batches of eggs. A trend similar to that reported as in the previous test in relation to the effects of SHMP and gelatin was found.

TABLE 5
COMMERCIAL WHIPPABILITY TEST

| EXAMPLE NUMBER | PRODUCT OF EXAMPLE | pH | HEIGHT (CM) | SPECIFIC GRAVITY | SYNERESIS (ML) 30 MIN. | 60 MIN. |
|---|---|---|---|---|---|---|
| 28 | 1 | 8.4 | 12.70 | .0791 | 6.2 | 17.0 |
| 29 | 2 | 8.6 | 13.97 | .0835 | 4.6 | 13.6 |
| 30 | 3 | 8.4 | 13.46 | .0821 | 5.0 | 13.6 |
| 31 | Control* | 8.9 | 12.70 | .0919 | 3.8 | 11.0 |
| 32 | 4 | — | 13.97 | .0747 | 2.0 | 8.0 |
| 33 | 5 | — | 12.70 | .0804 | 2.6 | 10.4 |
| 34 | 6 | — | 12.70 | .0837 | 2.2 | 9.2 |
| 35 | Control* | — | 13.97 | .0809 | 4.3 | 11.4 |

*Liquid egg albumen - controls from different batches of eggs.

EXAMPLES 36–38
Soft Meringue

Soft meringue was prepared using a 50% replacement of liquid egg albumen with 50% of the egg albumen extenders of Example 4 (77% DLP, 19% SHMP and 4% gelatin) in accordance with the procedure of Examples 7–20 with the exception that the additional whipping time was extended to 8 minutes. The pH of the samples and control were 5. Examples 36 and 37 were duplicate samples of the product of Example 4. The following results were achieved.

TABLE 6
EFFECT OF 50% REPLACEMENT LEVEL ON FUNCTIONALITY OF ALBUMEN EXTENDER IN SOFT MERINGUE

| EXAMPLE | FOAM SP. GR. | SYNERESIS (ML.) | MERINGUE SP. VOL. |
|---|---|---|---|
| 36 | .1918 | 3 | |
| 37 | .1938 | 2 | |
| 38 Control | .1946 | 0 | |

On a 50% replacement level, extension of whipping time from the normal five minutes to eight minutes was required. Meringue produced at about a 50% replacement of the albumen with the albumen extenders of Example 4 appears to be stickier than at 25% replacement level. The volume of the meringue is greater than the albumen control. Therefore, a 25% replacement level is recommended though the replacement level can go higher to 50% if the functionality allows.

Using the commercial whipping test of Example 21 on a 50% albumen replacement level, the product of Example 4 produced a weak and unstable foam (31 milliliters of syneresis after 60 minutes) even when the whipping time was extended from 3 minutes to 8 minutes. The consistency of the foam was poor.

EXAMPLES 39–42

The following examples show the effect of gelatin and SHMP on the functionality of DLP and the functionality of permeate in soft meringue. The procedure of Examples 36–38 was followed. The permeate was prepared by adding an appropriate quantity of lactose to DLP to provide the approximate composition of the permeate, i.e. 3% protein (TKN), 81% lactose and 11% ash, the remainder being essentially lactate and citrate. The egg albumen extenders are compounded to 11.5% solids similar to that of egg albumen. All amounts are in grams unless otherwise stated. The permeate or delactosed permeate was used in a proportion of 77%, gelatin 4% and SHMP 19% based on the total dry weight of the egg albumen extender.

TABLE 7

| EXAMPLE | 39 (Control) gms | 40 50% gms | 41 Replacement gms | 42 Level gms |
|---|---|---|---|---|
| Liquid Egg Albumen Extender | 160 | 80 | 80 | 80 |
| Delactosed Permeate* | — | 25.5 | 19.8 | 6.6 |
| Lactose | — | — | — | 4.8 |
| SHMP | — | — | 1.76 | 1.76 |
| Gelatin | — | — | 0.36 | 0.36 |
| Water | — | 54.5 | 58.2 | 63.3 |

*Liquid containing 36% solids.

TABLE 8

| EXAMPLE | Specific Gravity | Specific Volume | Syneresis 24 Hrs. at 4° C. |
|---|---|---|---|
| 39 | 0.2033 | 5.82 | 2.6 ml. |
| 40 | 0.1866 | 7.52 | 4.6 ml. |
| 41 | 0.1902 | 6.82 | 2.9 ml. |
| 42 | 0.2066 | 6.79 | 2 ml. |

The above data demonstrates that DLP in combination with egg albumen either alone (Example 40) or in combination with other additives (Examples 41 and 42) provides an improved specific volume over that obtained using egg albumen alone (Example 39). DLP when used alone is unstable evidenced by the fact that the syneresis is increased over the egg albumen control. The use of the DLP or the permeate with gelatin and SHMP (Examples 41 and 42) provides improved specific volume while maintaining the stability at the approximate level of the control.

EXAMPLES 43–46
Soft Meringue

Soft meringues were prepared using the product of the present invention (Example 4) in comparison to controls prepared with albumen and two commercial whipping aids. The procedure of Examples 7–20 was used. The pH of samples 43 and 44 was 5.0 while 45 and 46 had a pH of 4.9. The following results were obtained.

TABLE 9
A COMPARISON OF FUNCTIONALITY OF VARIOUS ALBUMEN EXTENDERS IN SOFT MERINGUE (25% REPLACED).

| EXAMPLE | SAMPLE | FOAM SP. GR. | SYNERESIS (ML) | MERINGUE SP. VOL. | APPEARANCE |
|---|---|---|---|---|---|
| 43 | Albumen Control | .1927 | 0 | 6.375 | Stiff Peaks |
| 44 | DLP, SHMP | .1832 | 1 | 7.450 | Stiff Peaks |
|  | GELATIN BLEND OF EX. 4 | .1942*** | — | 7.872 |  |
| 45 | ENZYME HYDROLYZED | .1616 | 4.0 | 7.867 | Flat |
|  | WHEAT PROTEIN* | .1698*** | 4.0 | 8.450 |  |
| 46 | ENZYME HYDROLYZED | .1628 | 7.0 | 6.071 | Very Flat |
|  | SOY PROTEIN** | .1634*** | 7.5 | 6.718 |  |

*Hyfoama 68
**Gunther D-100
***Duplicate Run

On a 25% liquid albumen replacement level, both commercial whipping agents produced lighter foams than the DLP/SHMP/gelatin blend of the invention but these were unstable. Meringues made with the two commercial whipping blends were flat in appearance indicating the lack of heat settability. DLP/SHMP/gelatin blend produced meringue with stiff peaks similar to the albumen control. The specific volume of the meringue containing the blend was greater than the albumen control.

In the absence of egg albumen, with DLP/SHMP/gelatin blend with a protein content of less than 15% is not whippable. The two commercial whipping agents having a protein content greater than 60% are whippable in the absence of egg albumen.

EXAMPLES 47-50
DIVINITY CANDY

A divinity candy was prepared by blending 497 grams of sugar, 217 grams of corn syrup, 112 grams of water, and 1.5 grams of salt. This blend was heated to 129° C. without stirring.

In another vessel, 8.4 grams of dry egg albumen or albumen replacer, and 0.29 grams anhydrous monocalcium phosphate were hydrated in 59.5 milliliters of water and dispersed at Speed No. 10 in a Kitchen Aid mixer to form a foam.

The hot syrup mixture was slowly added to the prewhipped foam of the previous step while whipping at Speed No. 8 for two minutes. The whipping was continued at Speed No. 10 for an additional two minutes or until the mixture lost gloss.

The mixture was spread on waxed paper and allowedd to cool.

The candy was tested for specific volume and hardness on a Precision Penetrometer using a cone loaded with a weight of 20 grams. The results of the tests on the candy preparation are reported below in Table 10. All percentages in the table are on a dry weight basis. The percentages in brackets are based on the total weight of the delactosed permeate, SHMP and gelatin.

TABLE 10

| EXAMPLE | 47 | 48 | 49 | 50 |
|---|---|---|---|---|
| Egg Albumen* - % | 100 | 75 | 75 | 75 |
| Delactosed Permeate % | — | 19.25 (77%) | — | — |
| SHMP-(N ave. 9-12) % | — | 4.75 (19%) | — | — |
| Gelatin % | — | 1.0 (4%) | — | — |
| Enzyme Hydrolyzed Wheat Protein** | — | — | 25% | — |
| Commercial Whipping Aid*** | — | — | — | 25% |
| Candy |  |  |  |  |
| Specific Gravity | .5828 | .6003 | .6457 | .6150 |
| Specific Volume | 1.400 | 1.396 | 1.352 | 1.399 |
| Hardness**** (1/10 mm) |  |  |  |  |
| 24 Hours | 115 | 123 | 116 | 15 |
| 96 Hours | 106 | 104 | 114 | 31 |

*Henningson Foods P.20
**Hyfoama 68
***Gunther 400-V
****Penetrameter reading, cone loaded with 20 gram weight.

On a 25% dried albumen replacement level, both the DLP/SHMP/gelatin blend of the present invention and the enzymatically hydrolyzed wheat protein whipping aid made divinity candy comparable in both texture and flavor to the albumen control. Candy made with the enzyme modified soy protein whipping aid (Gunther's 400-V) was harder in texture and shorter in grain than the other two.

EXAMPLE 51

Lemon Merinque Pie

In order to determine the effect of storage on the functionality of the DLP/SHMP/gelatiin blend of the invention in lemon meringue pie, meringue containing the blend of Example 4 to replace 25% albumen was baked on top of a lemon pie in a 204° C. (400° F.) oven for seven minutes. The baked pie was stored inside of a box at 4° C. (40° F.) No change in shape and texture of the meringue was observed following 24 hours of storage. A crack on the meringue portion of the pie made with the blend was observed following 72 hours of storage. In general, the meringue pie made with the blend was comparable to the albumen control pie. The texture of the meringue made with the blend was more uniform in cell structure than the albumen control. Further dulplications of this experiment produced no cracks on the meringue.

The invention is further defined in the claims which follow:

What is claimed is:

1. An egg albumen extender comprising at least 65% of a derived protein-containing composition from plant or animal sources wherein the molecular weight of said derived protein-containing composition is less than 20,000, said composition having a total Kjeldahl nitrogen content of from about 0.45% to about 2.1% of which at least 60% of the nitrogen is non-protein nitrogen and a fat content of less than 0.25% with a member selected from the group consisting of from about 1% to about 15% gelatin; from about 1% to about 15% gelatin and from about 5% to about 25% of a water soluble polyphosphate, the additive total of gelatin and phosphate not to exceed about 35%; from about 0.5% to about 5% of a gum, and mixtures thereof; and from 0% to about 30% of a whipping aid, all percentages are by weight based on the total dry solids weight of the egg albumen extender.

2. The extender as recited in claim 1 wherein said member is gelatin.

3. The extender as recited in claim 1 wherein said member is gelatin and a water soluble polyphosphate.

4. The extender as recited in claim 3 wherein said gelatin is used within a range of from about 3% to about 5% and said polyphosphate is used with a range of from about 18% to 20%.

5. The extender as recited in claim 3 wherein said polyphosphate is sodiium hexametaphosphate.

6. The extender as recited in claim 1 wherein said member is a gum.

7. The extender as recited in claim 6 wherein said gum is selected from the group consisting of carrageenan, sodium alginate, potassium alginate, accacia, cellulose gums, guar, xanthan and mixtures thereof.

8. The extender as recited in claim 7 wherein said gum is carrageenan.

9. The extender as recited in claim 1 wherein said derived protein-containing composition is prepared from a member selected from the group consisting of oil seeds, legumes, milk and milk derived products.

10. The extender as recited in claim 9 wherein said member if an oil seed.

11. The extender as recited in claim 9 wherein said member is a legume.

12. The extender as recited in claim 11 wherein said legume is soy bean.

13. The extender as recited in claim 9 wherein said member is a milk derived product.

14. The extender as recited in claim 13 wherein said milk derived product is whey.

15. The extender as recited in claim 13 wherein said milk product is derived from whey.

16. The extender as recited in claim 15 wherein said milk product derived from whey is the permeate resulting from the ultrafiltration of whey.

17. The extender as recited in claim 15 wherein said milk product derived from whey is the delactosed permeate resulting from the ultrafiltration of whey.

18. The extender as recited in claim 15 wherein said milk product derived from whey comprises from about 3% to about 13% protein based on total Kjeldahl nitrogen, from about 40% to about 85% lactose and from about 10% to about 35% ash, said percentage being on a dry solids weight basis of the total weight of said derived product.

19. The extender as recited in claim 1 which further includes an enzyme hydrolyzed plant protein whipping aid selected from the group consisting of enzyme hydrolyzed wheat protein and enzyme hydrolyzed soy protein.

20. The extender as recited in claim 19 wherein said enzyme hydrolyzed wheat protein contains from 0% to about 10% sugar and 0% to about 20% starch, the total being at least 5%.

21. The extender as recited in claim 17 which consists essentially of from about 65% to about 75% delactosed permeate, from about 3% to about 5% gelatin and from about 18% to about 20% sodium hexametaphosphate.

22. An extended egg albumen composition comprising from about 40% to about 99.5% liquid egg albumen, and from 0.5% to 60% of the extender of claim 1, said extended egg albumen composition having a percent solids within the range of from about 9% to about 14%.

23. The composition as recited in claim 22 wherein said liquid egg albumen is present in an amount ranging from about 70% to about 80% and said egg albumen extender product is present in an amount ranging from about 30% to about 20%.

24. A bakery product normally containing from about 0.1 to 10% whole egg wherein up to 50% of the whole egg requirement is replaced with the composition of claim 1.

25. The bakery produuct as recited in claim 24 wherein said product contains a meringue.

26. A dry extended egg albumen extender comprising from about 40% to about 99.5% dry egg albumen, and from about 0.5% to about 60% of the composition of claim 1.

27. In a food composition normally containing from about 0.5% to about 10% egg albumen, the improvement which comprises replacing from about 0.5% to about 60% of the egg albumen with the extender of claim 1.

28. The food composition of claim 27 wherein said food composition is a bakery product.

29. The food composition of claim 27 wherein said food composition is a confection.

30. The confection as recited in claim 29 wherein said confection is divinity candy.

31. A composition as recited in claim 1 wherein the derived protein-containing composition is prepared from soy whey, cheese whey and casein whey.

32. A whole egg replacer composition comprising a member selected from the group consisting of egg yolk, an egg yolk replacer and mixtures thereof in combination with the extender of claim 1 and mixtures thereof with egg albumen.

* * * * *